Patented Mar. 6, 1934

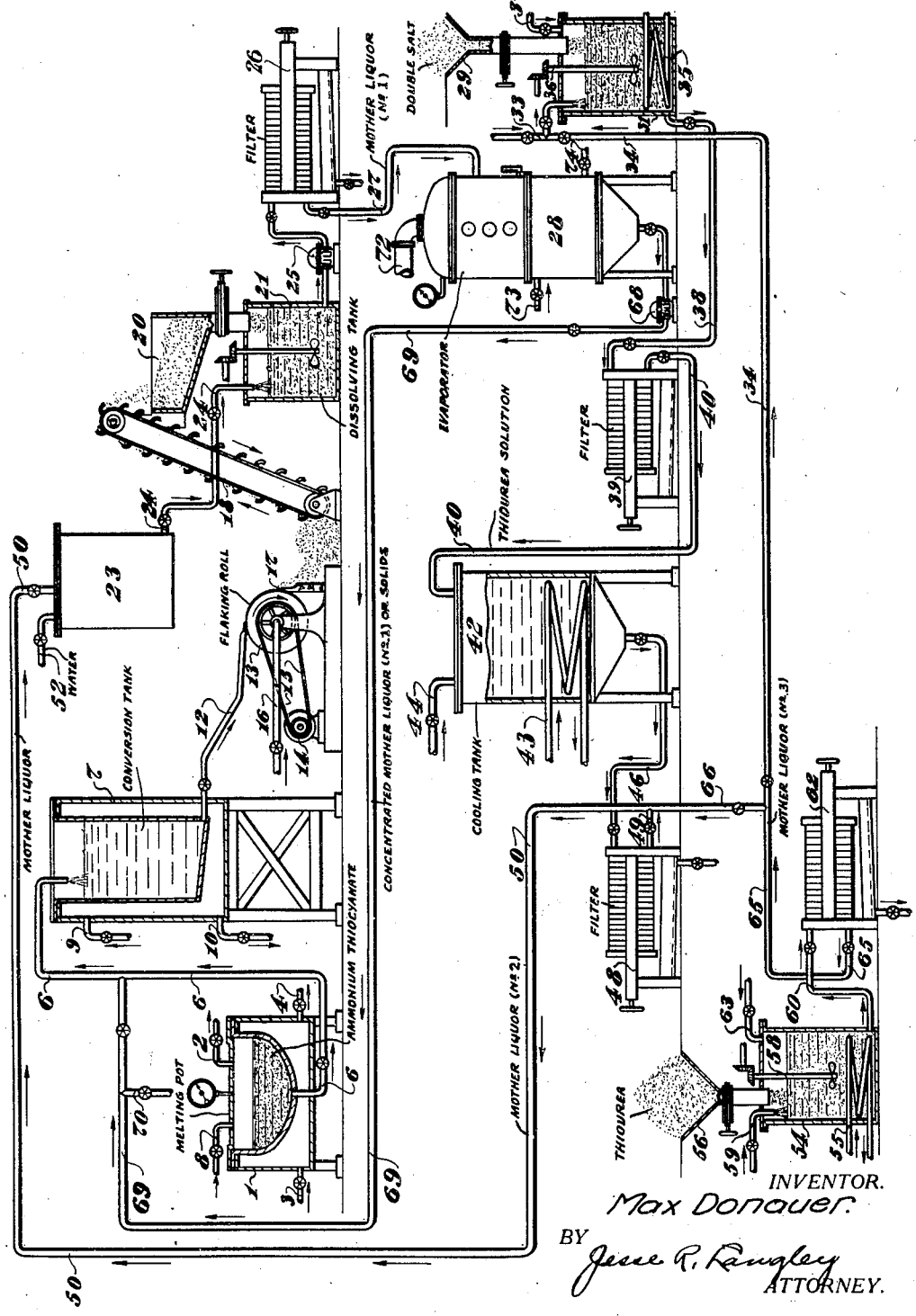

1,949,738

UNITED STATES PATENT OFFICE 1,949,738

MANUFACTURE AND SEPARATION OF THIOUREA FROM AMMONIUM THIOCYANATE

Max Donauer, Arlington, N. J., assignor to The Koppers Company of Delaware, a corporation of Delaware Application January 31, 1931, Serial No. 512,658

14 Claims. (Cl. 260—125)

My invention relates to the manufacture and purification of chemical compounds, and especially to the conversion of ammonium thiocyanate to thiourea and the product obtained thereby. In a more specific aspect, my invention relates to the sepaartion of chemical compounds, such as ammonium thiocyanate and thiourea.

An object of my invention is to provide a process of separating chemical compounds such as ammonium thiocyanate and thiourea.

A second object of my invention is to provide a process whereby ammonium thiocyanate is more efficiently and economically converted to thiourea than has been possible in the past.

Another object of my invention is to provide a process of manufacturing thiourea wherein the cooling effect obtainable by dissolving ammonium thiocyanate is utilized to facilitate the recovery of the thiourea.

My invention has for further objects such other advantages and results as are found to obtain in the process and product hereinafter described and claimed.

It is well known that ammonium thiocyanate can be converted into thiourea by heating to suitable temperatures. The prevailing theory regarding the effect of such heating is that it brings about a molecular rearrangement according to the equation:

$$NH_4CNS = CS(NH_2)_2$$

The extent of this conversion depends on the temperature to which the thiocyanate is heated, the duration of the period throughout which the conversion mass is maintained at that temperature, and other factors. At 140° C., for example, equilibrium is reached when the conversion mass contains 28% thiourea, but a period of eight hours is required to reach this point. At 180° C., the equilibrium is at 21% thiourea, but this is reached in one-half hour.

At 180°, however, the loss by decomposition of thiourea into hydrogen sulphide and cyanamide is comparatively high. Furthermore, these decomposition products lead to further losses if allowed to remain in the conversion mixture, so that the total loss may amount to from 3% to 5% of the total ammonium thiocyanate, or 20% to 30% of the recoverable thiourea at each heating. There is very little loss at 140°.

The reaction which liberates most of the H₂S during conversion is presumably:

$$CS(NH_2)_2 + heat = H_2S + CN.NH_2$$
thiourea             cyanamide

The cyanamide reacts with ammonium thiocyanate to form guanidine thiocyanate, which remains as an impurity in the conversion mass:

$$CN.NH_2 + NH_4CNS = CNS.CN_3H_6$$
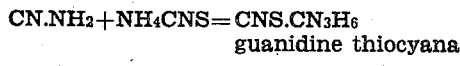

If the H₂S is not removed, it reacts with NH₄CNS to form ammonium trithiocarbonate:

$$NH_4CNS + 2H_2S = CS(SNH_4)_2$$

which causes further losses by subliming as such, or by breaking down to form carbon bisulphide and ammonium sulphide.

It is obviously important to keep losses by decomposition as low as possible because, in order to obtain an amount of thiourea equivalent to the amount of thiocyanate started with, it is necessary to re-process the unconverted residues several times. For instance, if the recoverable yield of thiourea from one conversion is 15% to 18% of the conversion mass, by weight, which is a typical range for processes known to the prior art, it is necessary to re-process the unconverted residues six times or more in order to obtain complete conversion to thiourea. As losses by decomposition are multiplied by re-processing, it has frequently happened in the past that only 50% to 60% of the thiocyanate has been recovered as thiourea.

In the processes known to the prior art, ammonium thiocyanate was usually heated to a temperature between 140° and 180° C. and held at that temperature for a sufficient period to allow the conversion to come to equilibrium. The conversion mass was then dissolved in water, preferably while still molten, and the solution was transferred to a jacketed kettle or other suitable cooling vessel, cooled, as with ice water, to about 25° C., and then with refrigerating brine to about 0° C.

Below 25° a double salt of thiourea and ammonium thiocyanate began to crystallize out in long fine needles. As the cooling and crystallization proceeded, these needle-like crystals caused the slurry to thicken until it almost solidified, making it very difficult to handle, necessitating constant stirring, and greatly decreasing the efficiency of cooling. When crystallization was completed, the double salt was filtered off and re-dissolved, and cooled again to crystallize thiourea. If a very pure product was desired, this thiourea was again re-crystallized.

My present invention provides an improvement on the prior art, resulting in greatly increased efficiency and economy in recovering thiourea from the conversion mass. In the process of my invention the ammonium thiocyanate is quickly heated to a temperature somewhat above the melting point,—for example, 160° C.—and then allowed to cool rather slowly in a jacketed or well insulated conversion tank.

Most of the conversion takes place in a comparatively short time, and as the temperature decreases maximum conversion is reached. The cooling of the liquid conversion mass continues until a temperature slightly above the solidifying (or melting) point, such as 110° to 120° C. is reached. I have obtained very satisfactory results by holding the temperature of a molten batch at about 160° for about two hours, and then letting it drop to about 110° over night, for example.

The molten mixture is then discharged onto a cooled granulating disc or a flaking roll or the like, on which cooling and solidification are completed, and the conversion mass is finely divided into flakes or granular particles.

This is a very efficient means of cooling, and it allows any $H_2S$ liberated during conversion to escape freely, so that the liquor obtained when the mass is redissolved is substantially free from decomposition products and consequently more suitable for re-processing. It also leaves the mass in such a condition that the cooling effect obtained by adding water to solid ammonium thiocyanate, which dissolves endothermically, can be utilized to advantage in separating the thiourea from the mixture.

The dry flaked or granulated conversion mass is then transferred to a dissolving tank and mixed with the proper amount of aqueous liquid such as water and/or mother liquor from thiourea recrystallization. This liquid is preferably at a temperature of about 10° to 14° C., and is preferably supplied in such quantity that the resulting solution has an ammonium thiocyanate content of about 535 grams per liter.

When water at this temperature is added to the conversion mass, the ammonium thiocyanate contained therein goes into solution rapidly and the temperature of the solution drops to about −10° C. With the water or liquor pre-cooled to 4° C., temperatures as low as −20° C. have been obtained by dissolving the conversion mass.

At −10° C., thiourea has a solubility in water of only 35 grams per liter, while ammonium thiocyanate is still soluble up to 535 grams per liter. This results in a solubility ratio of more than 15 to 1, which is exceptionally high and better than is obtainable with most of the more expensive organic solvents.

Since this satisfactory ratio is obtained by starting the solvent water or mother liquor at a temperature of 10° to 14° C., as stated hereinabove, it is seldom desirable to incur extra expense by precooling the solvent to lower temperatures. Water at this temperature is available in many localities, for most of the year at least, without any artificial cooling, and water occurring naturally at somewhat higher temperatures, such as 22° C., has also given satisfactory results at this stage of the process.

Ammonium thiocyanate dissolves rapidly from the thin flakes or granules of the conversion mass, but the double salt of ammonium thiocyanate and thiourea does not dissolve appreciably and remains as a fine, white, powdery precipitate. A slurry is formed which is generally quite limpid, and much more easily filtered and otherwise handled than the slurry formed in previous processes, when the needle-like crystals of double salt would nearly cause the slurry to solidify.

The double salt is filtered out as before, and re-dissolved in hot water to which decolorizing carbon and a filter aid may be added if desired. This solution is filtered while hot to remove the carbon and/or other solids, and is then cooled to recover the thiourea in crystalline form. If desired, a further re-crystallization may be practiced, as before.

The mother liquor from which the double salt is separated is concentrated and evaporated to dryness, and the mother liquor solids thus obtained are added to fresh ammonium thiocyanate and re-processed. The mother liquor from the first re-crystallization of thiourea may be used for dissolving the flaked conversion mass, and the mother liquor from the final re-crystallization, when practiced, is suitably used for the same purpose or for the first recrystallization.

By means of these improvements on the processes of the prior art, I have obtained yields of thiourea amounting to 85% and over, as compared with 50% or thereabouts reported in the literature, and I have also effected a considerable saving in the cost of processing.

With the objects set forth above and other objects in view, I now describe with reference to the accompanying drawing a preferred method of practicing my improved process of thiourea manufacture and recovery. In the drawing, The single figure is a partially diagrammatic view partly in elevation and partly in vertical section of apparatus suitable for the practice of my invention.

Crystalline ammonium thiocyanate and/or mother liquor solids are melted in a jacketed melting pot 1 or other suitable device. This melting is preferably conducted under vacuum maintained by means of a vacuum pump (not shown) connected with the pot by means of a pipe 2. Heat is supplied by steam admitted to the jacket of the pot through a pipe 3. Spent steam and/or condensate are discharged through a pipe 4.

When the desired temperature is reached—for example, 160° C.—the molten conversion mass is discharged through a pipe 6 into a holding tank 7 by air admitted through a pipe 8 or by other suitable means of delivery. The tank 7 is insulated or provided with a jacket by means of which the desired temperature within the tank can be maintained. In the present instance, a jacketed vessel is used. Steam is supplied to the jacket through a pipe 9 and discharged through a pipe 10. In some instances it may be desirable to eliminate the melting pot 1 and conduct the melting in the holding tank 7.

After the molten conversion mass has remained in the tank 7 until the desired conversion has been obtained and the temperature has fallen nearly to the solidifying point, the mass is withdrawn through a pipe 12 onto a flaking roll 13 or other suitable granulating device, such as a rapidly rotating air-cooled disk.

The roll 13 is revolved slowly by a motor 14 and a belt 15, or other suitable driving mechanism, and is maintained at a temperature low enough to completely solidify the conversion mass by cooling water supplied preferably to the interior of the roll through a pipe 16. The molten conversion mass is distributed in a thin layer on the surface of the roll. Its heat is transferred through the roll to the cooling water, and the mass is solidified in a thin sheet. This sheet is then removed from the roll by a scraper 17 in the form of thin flakes, which are transferred by a conveyor 18 or other suitable means into a hopper 20.

The flaked conversion mass is discharged from the hopper 20 into a dissolving tank 21 wherein it is mixed with a suitable quantity of water and/or mother liquor which is delivered preferably at a temperature of 10° to 14° C. from a tank 23 through a pipe 24 into the dissolving tank. During this mixing with cold water the ammonium thiocyanate is rapidly dissolved, cooling the solution to about −10° C., as stated hereinabove.

The double salt of ammonium thiocyanate and thiourea, being substantially insoluble at this temperature, remains undissolved in the form of a white precipitate, which forms a limpid slurry with the ammonium thiocyanate solution. This slurry is delivered by a pump 25 through a filter 26 which separates the double salt from the mother liquor. The mother liquor, consisting principally of ammonium thiocyanate solution, is discharged through a pipe 27 into an evaporator 28 and the double salt is discharged into a hopper 29 or other suitable feeding device which delivers it into a dissolving tank 31.

In tank 31 the double salt is dissolved in water supplied through a pipe 33 and/or mother liquor from a later stage of the process supplied through a pipe 34. This water or liquor is heated to a temperature at which the double salt is comparatively soluble, such as about 60° C., by means of a steam coil 35 in the tank, and a stirring device 36 is used to assist in dissolving the double salt if necessary.

Decolorizing carbon and/or a filter aid may be added to the solution if desired to assist in the removal of organic coloring matter and other impurities such as carbon and sulphur liberated by decomposition occurring during conversion. The hot solution is forced by compressed air admitted through a pipe 37, or other suitable delivery means, through a pipe 38, a filter 39 whereby solids are removed, and a pipe 40, into a storage tank or cooling tank 42.

In this tank 42 the solution is cooled by a cooling coil 43 or other suitable means to about 0° C. to crystallize the thiourea. The slurry is then blown by air supplied through a pipe 44, or otherwise transferred, through a pipe 46 to a filter 48 by which the crystallized thiourea is retained. These thiourea crystals usually contain 95% or more thiourea, and are sufficiently pure for most purposes.

The mother liquor passes from the filter 48 through pipes 49 and 50 to tank 23, from which it is withdrawn and used in dissolving a further quantity of the flaked conversion mass. The mother liquor can be used alone for this purpose, or after mixing with water supplied to the tank 23 through a pipe 52. As stated hereinabove, the water or liquor or both are preferably at temperatures between 10° and 14° C. when used, and if it is necessary to cool them to this temperature, such cooling can be effected by any desired means, such as by use of a cooling coil in the tank 23, adding ice to the liquor, etc.

If further purification of the thiourea recovered in the filter 48 is desired, the crystals are re-dissolved, preferably in fresh water, in a tank 54 which may be jacketed or provided with a coil 55 or other suitable means of heating and cooling. The thiourea crystals are admitted to the vessel 54 from a hopper 56 or other suitable feeding device, and mixed, as by a stirrer 58, with water admitted through a pipe 59. The mixture is heated until the crystals are completely dissolved. The solution is then cooled again to crystallize thiourea, and the slurry is transferred through a pipe 60 to a filter 62 by air admitted to vessel 54 through a pipe 63.

The thiourea crystals recovered by the filter 62 are very pure, having a thiourea content of 99% or more when dry. The final mother liquor is discharged from the filter through a pipe 65, from which it may flow through pipes 66 and 50 to tank 23 or through pipe 34 to tank 31. In either case it is reused in an earlier stage of the process.

The mother liquor separated from the double salt by the filter 26 and therefrom transferred to the evaporator 28 contains about 535 grams per liter of ammonium thiocyanate. This liquor is concentrated substantially to dryness in the evaporator 28, preferably under vacuum, or it may be partially dehydrated in this evaporator 28 and then transferred as by a pump 68 through pipes 69 and 70 into the melting pot 1, in which evaporation is completed and the mother liquor solids are melted.

A vacuum is maintained in the evaporator 28 by means of a vacuum pump (not shown) connected to the vapor outlet 72. The evaporator is heated by steam which is supplied through a pipe 73 and discharged through a pipe 74, or by other suitable means.

Fresh ammonium thiocyanate crystals are added to the mother liquor solids in the vessel 1, and the mixture is melted and heated to the conversion temperature, and reprocessed as described hereinabove.

By means of my present invention, considerable improvement is made in the efficiency and economy of converting ammonium thiocyanate to thiourea. $H_2S$ formed by decomposition of the ammonium thiocyanate is allowed to escape readily, thus lessening the loss by decomposition and improving the quality of the mother liquor solids returned for re-processing. The endothermic solution of ammonium thiocyanate is utilized to advantage, and results in a considerable reduction in the cooling costs.

The double salt of thiourea is obtained in a more easily handled and readily filterable form than in the previously known methods, and the amount of crystallized thiourea recovered from one conversion is increased to about 22% or higher, thus decreasing the amount of re-processing necessary to obtain an amount of thiourea equivalent to the initial amount of thiocyanate.

However, although my invention has been described with reference to the manufacture and purification of thiourea, it is not limited to such use. It is also adapted to use in other chemical processes in which it is desired to separate two or more compounds, especially when the dissolving of the more soluble compound is an endothermic process. Processes in which this principle may be employed to advantage include the recovery of ammonium thiocyanate prepared by heating carbon disulphide and ammonium carbonate under pressure, and the recovery of potassium thiocyanate made by heating potassium ferrocyanide and sulphur, for example.

It will be obvious to those skilled in the art that various modifications can be made in the several parts of my apparatus and in the several steps of my process without departing from the spirit of my invention, and it is my intention to cover in the claims such modifications as are included within the scope thereof.

I claim as my invention:

1. In a process of separating a chemical compound from a second compound which dissolves endothermically, the step which comprises contacting a mixture while at ordinary room temperature and containing the two compounds with a quantity of solvent while at ordinary room temperature and which dissolves the said second compound and is thereby cooled to a temperature at which the first compound is relatively insoluble.

2. In a process of separating a chemical compound from another more soluble compound, the solution of which is an endothermic process, the step which comprises contacting a mixture while at ordinary room temperature and containing the two compounds with a quantity of solvent while at ordinary room temperature and which dissolves the more soluble compound and is thereby cooled to a temperature at which the other compound is relatively insoluble.

3. In a process of separating a chemical compound from a mixture including a second compound which dissolves endothermically, the steps which comprise adding said mixture at ordinary room temperature to water at ordinary room temperature and dissolving the said second compound therein to form a solution which in forming cools itself to a temperature at which the first compound is substantially insoluble.

4. The process of separating a compound from a second more soluble compound which goes into solution endothermically, which comprises dividing a mixture containing the two compounds into small particles, contacting the particles while at a temperature not substantially above ordinary room temperature with a solvent while at a temperature not substantially above ordinary room temperature in which the more soluble compound dissolves to form a solution which is thereby cooled to a temperature at which the first compound is relatively insoluble, and separating the solution from the undissolved compound.

5. The process of separating a compound from a second compound which dissolves endothermically in water, which comprises contacting a mixture containing the two compounds while at a temperature not substantially above ordinary room temperature with a quantity of water while at a temperature not substantially above ordinary room temperature and which dissolves the said second compound and is thereby cooled to a temperature at which the first compound is relatively insoluble, and separating the solution from the undissolved compound.

6. In a process of separating thiourea from ammonium thiocyanate the step which comprises contacting a mixture while at a temperature not substantially above ordinary room temperature and containing the two compounds with a quantity of water while at a temperature not subsantially above ordinary room temperature and which holds the solution from reaching saturation, enough ammonium thiocyanate being present that by its solution the reaction mixture is thereby cooled to a temperature at which thiourea is relatively insoluble.

7. In a process of separating thiourea from ammonium thiocyanate, the step which comprises contacting a mixture while at a temperature not substantially above ordinary room temperature and containing the two compounds with a quantity of water while at a temperature not substantially above ordinary room temperature and which holds the solution from reaching saturation, enough of the ammonium thiocyanate being present that by its solution the reaction mixture forms a solution containing about 535 grams per liter and is thereby cooled to a temperature at which the thiourea is relatively insoluble.

8. In a process of separating thiourea from ammonium thiocyanate, the step which comprises contacting a mixture while at a temperature not substantially above ordinary room temperature and containing the said compounds with a quantity of cold water while at a temperature not substantially above ordinary room temperature and which holds the solution from reaching supersaturation, enough of the ammonium thiocyanate being present that by its solution the reaction mixture is thereby cooled to a point at which the thioureau is precipitated.

9. In a process of separating thiourea from ammonium thiocyanate, the step which comprises contacting particles of a mixture while at a temperature not substantially above ordinary room temperature and containing the said compounds with a quantity of water at a temperature below 25° C. which holds the solution from reaching saturation, enough of the ammonium thiocyanate being present that by its solution the reaction mixture is thereby cooled to a point at which the thiourea is precipitated.

10. In a process of separating thiourea from ammonium thiocyanate, the step which comprises contacting particles of a mixture while at a temperature not substantially above ordinary room temperature and containing the said compounds with a quantity of water at a temperature between 10° and 14° C. which suffices to hold the solution from reaching saturation, enough of the ammonium thiocyanate being present that by its solution the reaction mixture forms solution containing about 535 grams of $NH_4CNS$ per liter and is thereby cooled to a temperature of about $-10°$ C., at which the thiourea is precipitated.

11. The process of separating thiourea from ammonium thiocyanate which comprises dividing a mixture containing the said compounds into small particles, contacting the particles while at substantially ordinary room temperature with a quantity of water while at substantially ordinary room temperature and which holds the solution from reaching supersaturation, enough ammonium thiocyanate being present that by its solution the reaction mixture is thereby cooled to a temperature at which the thiourea is relatively insoluble, and separating the solution from the undissolved thiourea.

12. The process of separating thiourea from ammonium thiocyanate which comprises dividing a mixture containing the said compounds into small particles, contacting the particles while at substantially ordinary room temperature with a quantity of cold water which suffices to hold the solution from reaching saturation, enough of the ammonium thiocyanate being present that by its solution the reaction mixture forms a solution containing more than 500 grams of $NH_4CNS$ per liter and is thereby cooled to a temperature at which thiourea is precipitated, and filtering precipitated thiourea from the solution.

13. The process of manufacturing thiourea which comprises melting ammonium thiocyanate and heating the molten mass to a temperature above 140° C. to form thiourea, cooling the partially converted mass slowly to a temperature near the melting point, solidifying and further cooling the mixture of ammonium thiocyanate and thiourea, contacting the solidified mixture while at a temperature not substantially above ordinary room temperature with a quantity of cold water which holds the solution from reaching supersaturation, enough ammonium thiocyanate being present that by its solution the reaction mixture is thereby cooled to a temperature at which thiourea is relatively insoluble, and separating the solution from the undissolved thiourea.

14. The process of manufacturing thiourea which comprises melting ammonium thiocyanate under vacuum and heating it to a temperature above 140° C. to form thiourea, slowly cooling the molten mixture of ammonium thiocyanate and thiourea to a temperature near its melting point, discharging the mixture in a thin layer onto a relatively cool surface and thereby solidifying it, removing the solidified mixture from the cool surface in the form of small particles, contacting the particles while at a temperature not substantially above ordinary room temperature with a quantity of water at a temperature below 25° C. which holds the solution from saturation, enough of the ammonium thiocyanate being present that by its solution the reaction mixture is thereby cooled to a temperature at which thiourea is relatively insoluble, separating the solution from the undissolved solids, dissolving the solids in water at a higher temperature, and cooling the solution thereby obtained to recrystallize thiourea.

MAX DONAUER.